United States Patent [19]

Suda

[11] Patent Number: 5,073,017

[45] Date of Patent: Dec. 17, 1991

[54] IMAGE DEFLECTING DEVICE

[75] Inventor: Shigeyuki Suda, Machida, Japan

[73] Assignee: Canon Kabushiki Kaisha, Tokyo, Japan

[21] Appl. No.: 434,578

[22] Filed: Nov. 13, 1989

Related U.S. Application Data

[63] Continuation of Ser. No. 18,426, Feb. 25, 1987, abandoned.

[30] Foreign Application Priority Data

Mar. 1, 1986 [JP] Japan .................................. 61-45112

[51] Int. Cl.⁵ ........................ G02B 27/64; G02B 15/00
[52] U.S. Cl. .................................. 359/557; 359/720;
[58] Field of Search ............... 350/436, 500, 418, 419, 350/484, 487, 359, 360, 361, 423

[56] References Cited

U.S. PATENT DOCUMENTS

| 3,212,420 | 10/1965 | De La Cierva | 350/484 |
|---|---|---|---|
| 3,532,409 | 10/1970 | Humphrey | 350/500 |
| 3,941,451 | 3/1976 | Humphrey | 350/500 |
| 3,942,862 | 3/1976 | Furukawa et al. | 350/500 |
| 4,444,471 | 4/1984 | Ford, Jr. et al. | 350/423 |
| 4,781,445 | 11/1988 | Baba et al. | 350/409 |
| 4,802,746 | 2/1989 | Baba et al. | 350/419 |

FOREIGN PATENT DOCUMENTS

| 2530831 | 1/1984 | France | 350/359 |
|---|---|---|---|
| 57-7414 | 10/1982 | Japan | 350/500 |
| 0176017 | 9/1985 | Japan | 350/360 |
| 2042757 | 9/1980 | United Kingdom | 350/436 |
| 2099171 | 12/1982 | United Kingdom | 350/500 |

Primary Examiner—Bruce Y. Arnold
Assistant Examiner—James Phan
Attorney, Agent, or Firm—Fitzpatrick, Cella, Harper & Scinto

[57] ABSTRACT

A telephoto lens is provided, in succession from the object side to the image surface side, with a first lens component having a positive refractive power and a second lens component having a negative refractive power. At least one curved lens surface of the second lens component is inclined relative to the optic axis to thereby deflect the image. Particularly the lens surface which near the image surface is inclined.

14 Claims, 5 Drawing Sheets

IMAGE DEFLECTING DEVICE

This application is a continuation of application Ser. No. 018,426, filed Feb. 25, 1987, now abandoned.

BACKGROUND OF THE INVENTION

1. Field of the Invention

This invention relates to a photo-taking lens having an image deflecting device suitable for a photographic camera or a video camera, and in particular to a simple photo-taking lens of good operability which prevents the entire optical system from becoming bulky.

2. Related Background Art

When a photograph is taken from on a vehicle or an aircraft which is in progression, vibration is transmitted to the photo-taking system and the photographed image becomes blurred. As means for preventing this, for example, U.S. Pat. No. 3,212,420 has heretofore proposed an image stabilizing optical system as shown in FIG. 1 of the accompanying drawings wherein an optical member 11 having a variable vertical angle prism action is disposed forwardly of a phototaking system 10 so that the vertical angle of the optical member 11 is varied in conformity with the magnitude of the tilting of the photo-taking system, whereby the picture plane is deflected and a still image is obtained on the imaging plane.

However, the method of disposing a variable vertical angle prism as image stabilizing means forwardly of the photo-taking system has required the disposition of a variable vertical angle prism of a size corresponding to the size of the effective diameter of the forward lens group of the photo-taking system which is generally large, and this has led to bulkiness and reduced operability of the entire optical system. Such disadvantages will appear particularly remarkably if such image stabilizing means is provided in a telephoto lens in which the effective diameter of the forward lens group is large. There is U.S. Pat. No. 3,942,862 as other related art.

SUMMARY OF THE INVENTION

It is a first object of the present invention to achieve deflection of images without increasing the size of the photo-taking system It is a second object of the present invention to provide a photo-taking system which is capable of simply deflecting images.

It is a third object of the present invention to correct aberrations well under the second object.

Under these objects, the photo-taking system of the present invention has, in succession from the object side, a first lens component having a positive refractive power and a second lens component having a negative refractive power, and at least one curved diverging or converging lens surface of the second lens component is inclined relative to the optic axis.

Further features of the present invention are described in the following description taken in conjunction with the accompanying drawings.

DETAILED DESCRIPTION OF THE PREFERRED EMBODIMENTS

Figure 1:
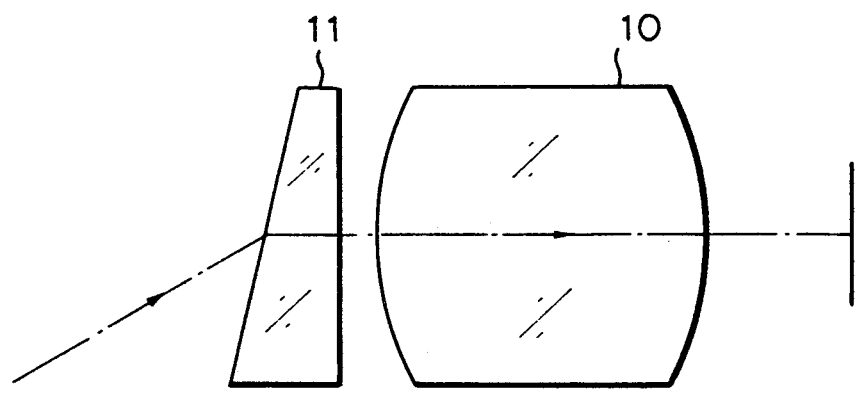
FIG. 1 is a schematic view of the optical system of an image stabilizing optical system according to the prior art.
Figure 2:
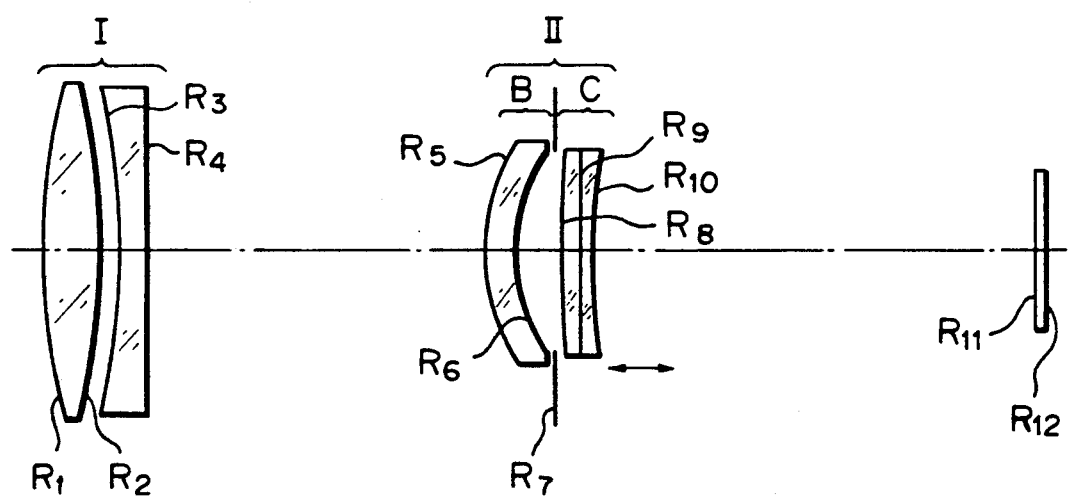
FIG. 2 is a cross-sectional view of a lens system according to a numerical embodiment of the present invention.

FIG. 2 is a cross-sectional view of a lens system according to a numerical embodiment of the present invention. In FIG. 2, I designates a first group of positive refractive power, and II denotes a second group of negative refractive power having a fixed lens group B and a lens group C movable on the optic axis or variable in refractive power.

In the present embodiment, the lens group C is moved on the optic axis toward the image surface side, whereby focusing to an object at infinity and to an object at a short distance is accomplished. The technique of varying the refractive power and thereby accomplishing focusing will be described later.

The last lens surface R10 of the lens group C is inclined in conformity with the tilling of a phototaking system to thereby accomplish the deflection of the picture plane, i.e., the imaging plane, whereby an image stabilizing system in which vibration of photographed image is prevented is constructed.

As a method of inclining a lens surface, the lens is formed of a transparent elastic material such as silicon rubber as proposed in our Japanese Laid-Open Patent Application No. 151603/1985, and a specific example thereof will be described later.

In the present embodiment, the second group is divided into two lens groups, of which the lens group C formed, for example, of an elastic material which is adjacent to the image surface side, is moved as previously described to thereby reduce the fluctuation of aberrations during focusing and the last lens surface of the lens group C is inclined in response to the vibration of the photo-taking system to thereby effect deflection of the picture plane and reduce the variations in aberrations during the image stabilization.

FIGS. 3 and 4 show the various aberrations of the numerical embodiment when deflection of the picture plane is not effected and when deflection of the picture plane is effected.

Figure 3A:
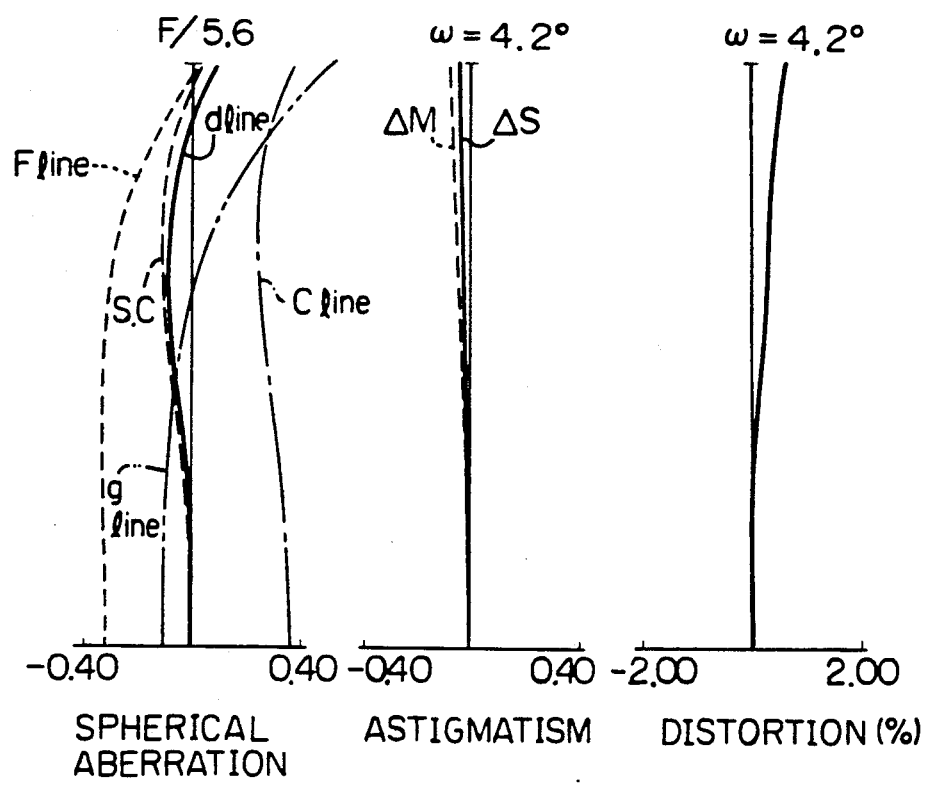
FIGS. 3A and 3B show the various aberrations for an object at infinity and an object at a distance of 3 m when picture plane deflection is not effected in the numerical embodiment of the present invention.
Figure 3A:
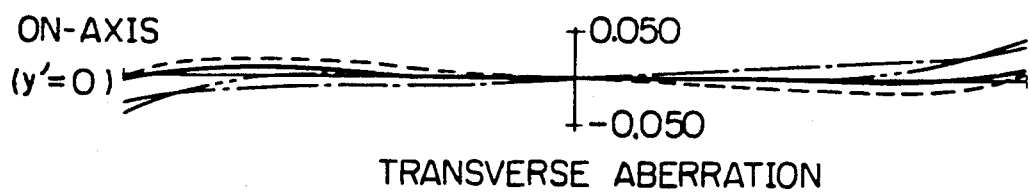
Figure 3B:
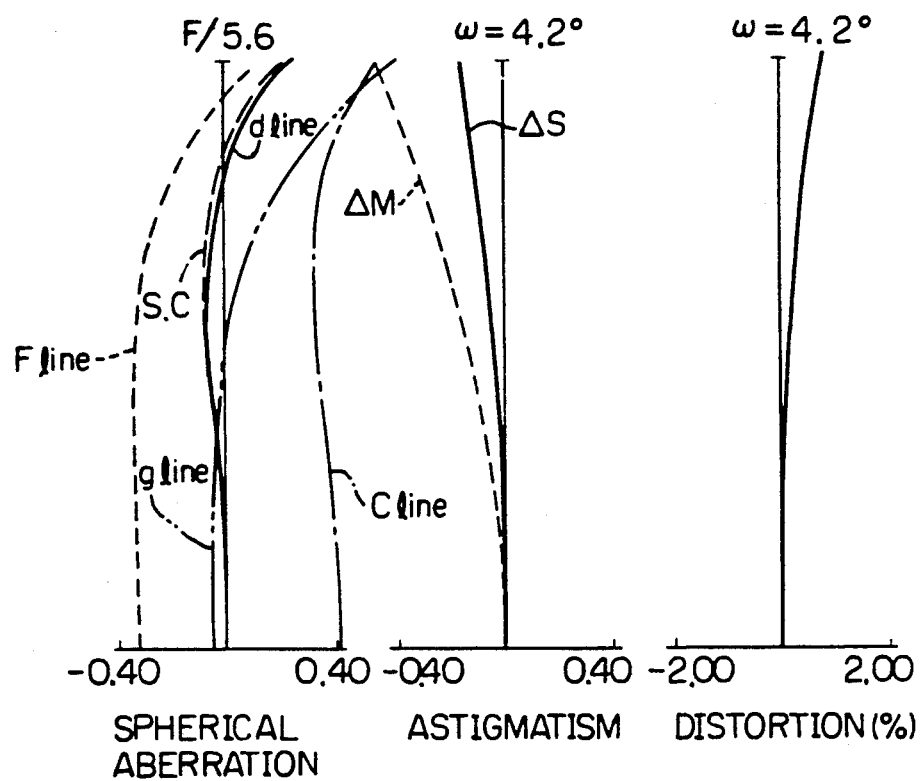
Figure 3B:
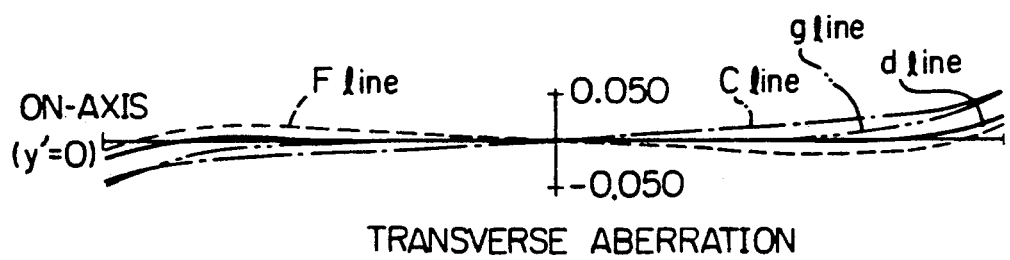
Figure 4A:
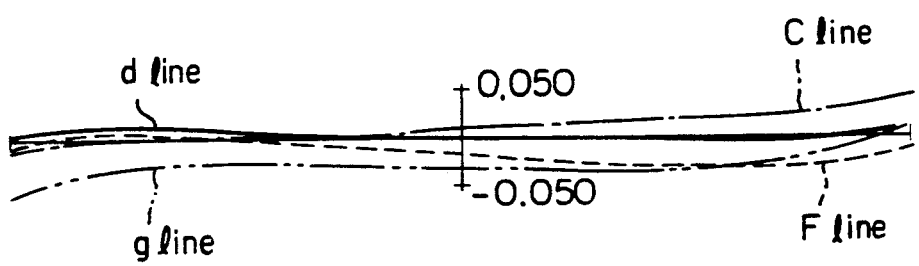
FIGS. 4A and 4B show the on-axis aberrations for an object at infinity and an object at a distance of 3 m when picture plane deflection is effected in the numerical embodiment of the present invention.
Figure 4B:
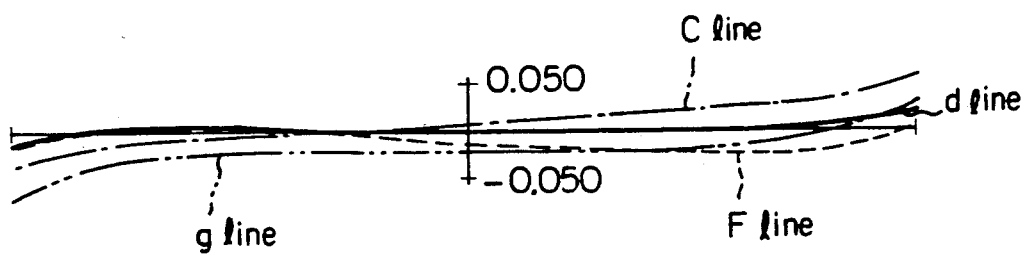

FIGS. 3A and 4A refer to the case of an object at infinity, and FIGS. 3B and 4B refer to the case of an object distance of 3 m.

The aberrational effect of the inclination eccentricity of a lens surface will now be described on the basis of the method shown by Matsui in the 23rd Physics Lecture Meeting (1962).

According to that method, if for simplicity, the direction of the optic axis is x and the direction of deflection is y, the amount of deflection of the picture plane, $\Delta y$ ($\epsilon \nu$), is represented by the following equation:

$$\Delta Y(\epsilon v) = \frac{\Delta \epsilon v \cdot hv(Nv' - Nv)}{ak'}, \quad (1)$$

where $v$ represents the number of the lens surface inclined, $\epsilon v$ represents the angle of inclination (red), $hv$ represent the height of the paraxial pupil found by pursuit on the paraxial axis, $a_k'$ represents the exit-converted angle of inclination of the entire system on the paraxial axis, and $Nv$ and $Nv'$ represent the refractive indices of the $v$ surface on the object side and the image side, respectively. Accordingly, simply expressing the physical meaning of the above equation, it means that as the surface passes through a higher position of the non-axis ray and as the refractive index used in that surface is higher, the amount of deflection per unit angle of inclination is greater.

However, assuming that the inclination is effected with the surface vertex fixed, if the movement stroke at $hv$ in the direction of the optic axis is $(\Delta x)v$, $$(\Delta x)v = hv(\epsilon v) \quad (2)$$

and hence, $$\Delta Y(xv) = \frac{(\Delta x)v(Nv' - Nv)}{ak'}. \quad (3)$$

Accordingly, only the refractive index of the lens is a parameter and the range of the refractive index is relatively small and therefore, it is seen that the amount of deflection of the picture plane per unit movement stroke which is important in practice hardly depends on the set position of the surface inclined. Consequently, the surface for effecting deflection of the picture plane may be selected with the degree of difficulty of the setting of the driving system and the degree of variation in aberrations taken into consideration.

The photo-taking lens according to the present invention, in order to shorten the full length thereof, adopts the telephoto type which comprises a lens group of positive refractive power disposed as a first lens group and a lens group of negative refractive power disposed as a second lens group.

For improved operability, focusing is effected by moving a small lens group C, and a fixed group B is provided as a construction for reducing particularly the fluctuation of spherical aberration during the focusing. Introduction of an additional optical element for image stabilization into such an optimized lens construction cannot be said to be advisable from the viewpoints of the bulkiness and cost of the system, and a system for deflecting by the number of constructions in this range. That is, where the device shown in the aforementioned U.S. Pat. No. 3,212,420 is provided in the a focal portion and the plane of this device is inclined, it is known that variations in aberrations except chromatic difference of magnification are small, but the provision of such an arrangement in the lens causes the entire lens system to the bulky, and this is not preferable.

Occurrence of chromatic difference of magnification caused by the inclination of a lens surface is substantially determined in principle by the dispersion value used in that surface. Moreover, where this aberration is a factor which determines the maximum amount of deflection of the entire system, it becomes possible to practically use it as deflecting means in the range in which the variation in monochromatic aberration is small relative to this aberration.

On the other hand, the theory regarding the monochromatic eccentricity aberration is shown the aforementioned Matsui's report, etc. On the basis of this, the eccentricity coma $\Delta Y$ coma which most greatly affects the optical performance when the lens surface is inclined is approximated by:

$$\Delta Y\, coma = \frac{-3R^2\, (II\epsilon)v \cdot \epsilon v}{2a_{k'}} \quad (4)$$

and $$(II\epsilon)v = hv \left( Nv' \sum_{\mu=v+1}^{k} II\mu - Nv \sum_{\mu=v}^{k} II\mu \right) - \quad (5)$$

$$hv \left( Nv' \sum_{\mu=v+1}^{k} I\mu - Nv \sum_{\mu=\mu}^{k} I\mu \right)$$

where R is the radius of the entrance pupil, and $I\mu$ and $II_{84}$ are third-order spherical aberration coefficient and coma coefficient, respectively.

In the numerical embodiment of the present invention which will be described later, $v = 10$, and finding the paraxial pursuit and third-order aberration coefficients with f being normalized into $f = 1$ for simplicity, F-value is 5.6 and therefore, the parameters necessary for the above equations are:

| | |
|---|---|
| R = | ½F = 0.0884 |
| ε10 = | 0.02004 |
| α10' = | 1.0 |
| N10 = | 1.4059 |
| N10' = | 1.0 |
| h10 = | 0.4416 |
| h10 = | 0.03722 |
| I10 = | 0.07314 |
| II10 = | 0.1828 |

The values of $hv$, $hv$, $Iv$ and $IIv$ are values of substantially the same order by using the construction of the present invention, and do not lose their generality. Finding $\Delta Y$ coma by the use of these values, $2.578 \times 10^{-5}$ when $f = 1$, and this is a sufficiently small value. It is seen that this is kept sufficiently small, say, 7.7 μm even when $f = 300$ mm. That is, according to the present invention, by inclining the surface of the movable lens group which is most adjacent to the image side to thereby effect deflection of the picture plane, it becomes possible to easily achieve a correcting optical system for image stabilization in which variations in aberrations are small.

Also, as the material of the lens elements according to the present invention, silicon rubber is suitable from the viewpoints of transparency, homogeneity and dispersion characteristic and therefore, the use of the refractive index nd = 1.4059 and Abbe number vd = 52.04 for d-line is desirable.

In the embodiment of FIG. 2, a lens formed of a transparent elastic material is cemented to a lens formed of an ordinary glass material to facilitate the inclination of the lens surface, but these lenses may be constructed separately from and independently of each other.

In the present invention, it is possible as a matter of course to mount and dismount behind the entire lens system expressed a filter or the like in the form of a parallel flat plate used in the ordinary lens and to further provide a fixed lens group rearwardly of the movable lens group.

Figure 5:
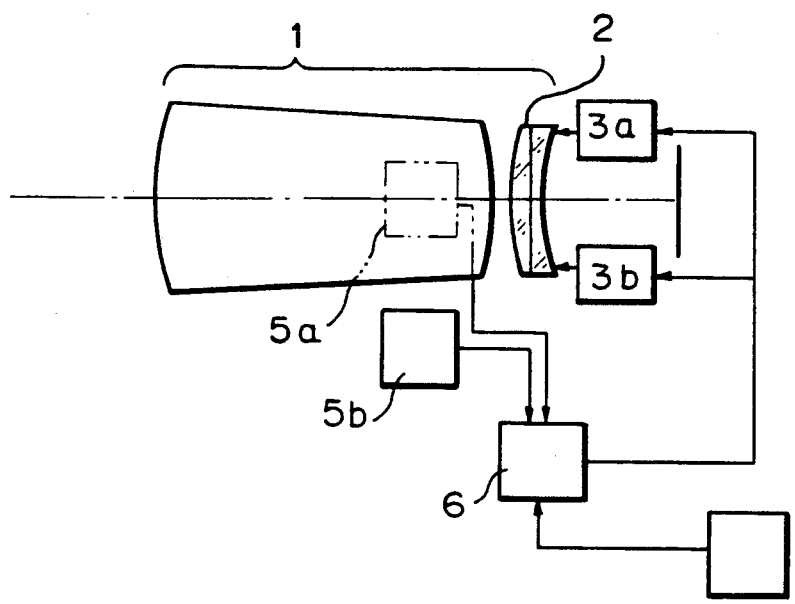
FIG. 5 shows the flow of a signal in a deflecting device according to the present invention.
Figure 6:
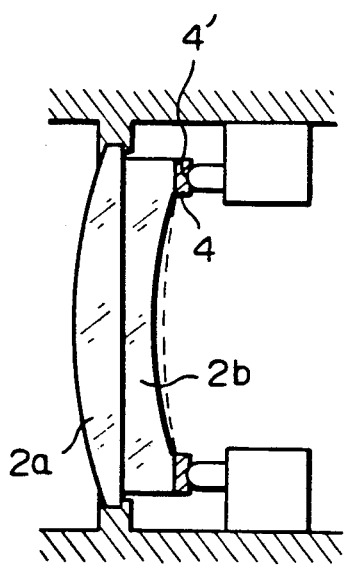
FIG. 6 illustrates the operation when the refractive power of a lens is varied.

FIG. 5 diagrammatically shows the device according to the present invention. Reference numeral 1 designates an optical system. A focusing lens 2 is disposed in a portion of the optical system, for example, at the rearmost end of the optical system. The focusing lens 2 in the present embodiment comprises a convexo-planar lens of optical glass and a variable power element of soft elasticity joined thereto. Reference characters 3a and 3b denote actuators for changing the refractive power and angle of refraction of the variable power element. These are particularly depicted in FIG. 6. In FIG. 6, reference character 2a designates a convexo-planar lens held in a lens barrel. Reference character 2b denotes a variable power element which is formed, for example, into a plano-concave shape. The edge portion of the variable power element is flat and an annular pressing plate 4 is joined thereto over the entire periphery thereof, and four spherical seats 4' are formed at equal angles. A pressing bar projects from each of the actuators 3a and 3b, and the fore end of the pressing bar is formed into a spherical surface fitting the concave surface of a respective one of the spherical seats 4' and is slidably engaged with the spherical seat. Although in FIG. 6, only the actuators arranged in the vertical direction are depicted, it is to be understood that two such actuators are also provided in the horizontal direction, and the fore end of the pressing bar of each actuator is engaged with a discrete spherical seat. The actuators may be of a structure which permits entrance and exit of the shaft in response to power supply, such as an electromagnet or a piezoelectric element having a pressing bar bonded to the lamination thereof.

Focusing of the photo-taking lens in FIG. 2 is accomplished by the lens group C being moved in the direction of the optic axis, but here is shown an example in which focusing is accomplished by varying the refractive power. A change in the refractive power of the variable power element 2b is realized by changing the curvature of the lens surface, and when the pressing bars of the actuators 3a and 3b are projected by a predetermined amount to push the marginal edge of the variable power element by the pressing plate 4, the surface of the variable power element is raised in the opening in the pressing plate 4 and assumes a shape indicated by broken line. Thus, the negative refractive power has been decreased. If a further pressing force is added the surface of the variable power element becomes approximate to a plane, and conversely, if the pressing force is decreased, the curvature of the surface of the variable power element 2b becomes sharper due to the action of restitution of the variable power element 2b itself and the negative refractive power is again increased.

Figure 7:
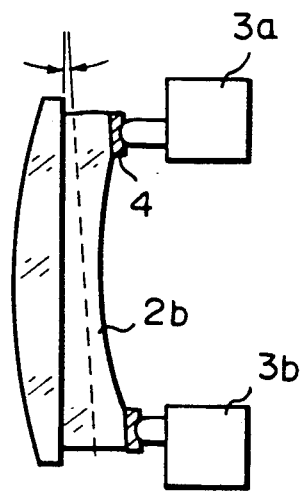
FIG. 7 illustrates the operation when deflection is effected.

Also, when the angle of refraction of the variable power element 2b is to be changed, if the pressing bar of the upper actuator 3a is projected and the pressing bar of the lower actuator 3b is retracted as shown in FIG. 7, the pressing plate 4 is inclined to press the variable power element 2b and thus, an optical wedge put between the broken line and the vertical line is formed in the variable power element 2b. Accordingly, if a light ray enters along the optic axis, it will be refracted downwardly and exit. Also, if the actuator disposed in the horizontal direction is actuated, the light ray can be refracted in a horizontal plane, and if said actuation is effected in overlapping relationship with the actuation of the actuator in the vertical direction, the light can be refracted in a desired direction.

Turning back to FIG. 5, reference character 5a designates a bias detector for detecting the inclination in the horizontal direction or the acceleration, and reference character 5b denotes a bias detector for detecting the component in the vertical direction. Where the detectors are accelerometers, integration is electrically effected twice to convert the result of the detection into an amount of displacement. Reference numeral 6 designates an output circuit for actuating the actuators 3a and 3b on the basis of the outputs of the detectors 5a and 5b so that a desired operation is achieved.

A numerical embodiment of the present invention will now be shown. In the numerical embodiment, Ri is the radius of curvature of the ith lens surface from the object side, Di is the thickness and air space of the ith lens from the object side, and Ni and νi are the refractive index and the Abbe number, respectively, of the glass of the ith lens from the object side.

| Numerical Embodiment | | | | | | |
|---|---|---|---|---|---|---|
| F = | 296.5 | FNO = | 1:56 | 2ω = 4.2° | | |
| R1 = | 101.5 | D1 = | 8.50 | N1 = 1.56384 | ν1 = | 60.7 |
| R2 = | −121.75 | D2 = | 3.15 | | | |
| R3 = | −111.80 | D3 = | 4.60 | N2 = 1.67270 | ν2 = | 32.1 |
| R4 = | −1945.20 | D4 = | 52.93 | | | |
| R5 = | 28.17 | D5 = | 4.47 | N3 = 1.58913 | ν3 = | 61.0 |
| R6 = | 25.60 | D6 = | 6.35 | | | |
| R7 = | Stop | D7 = | 1.30 | | | |
| R8 = | 291.68 | D8 = | 2.60 | N4 = 1.76182 | ν4 = | 26.6 |
| R9 = | 848.95 | D9 = | 1.60 | N5 = 1.40590 | ν5 = | 52.0 |
| R10 = | 96.36 | D10 = | 70.00 | | | |
| R11 = | ∞ | D11 = | 1.50 | N6 = 1.51633 | ν6 = | 64.1 |
| R12 = | ∞ | | | | | |

* The amount of movement Δx of R8-R10 relative to the object point 3m is 50.80
* The amount of deflection of the picture plane when the angle of inclination of the surface R10
  1.39 mm when the object point is ∞
  0.973 mm when the object point is 3m According to the present invention, a photo-taking lens can be achieved in which by inclining particularly the last lens surface of the lens group, the image stabilizing function is performed by a simple construction without increasing the size of the entire photo-taking system and which has an image stabilizing function free of fluctuation aberrations.

I claim:

1. An image deflecting device including:
   photo-taking means having, in succession from the object side to the image surface side, a first lens component having a positive refractive power and a second lens component having a plurality of lens surfaces and having a negative refractive power wherein said second lens component comprises an elastic member;
   detection means for detecting an inclination of said photo-taking means and outputting a detection signal which represents an amount of displacement; and
   means for actively and selectively inclining at least one lens surface of said second lens component relative to the optic axis in accordance with the detection signal output of said detection means.

2. An image deflecting device according to claim 1, wherein said one lens surface is the lens surface nearest to the image surface side.

3. An image deflecting device according to claim 1, wherein focusing of said photo-taking means is accomplished by moving at least one lens of said second lens component along the optic axis.

4. An image deflecting device according to claim 1, wherein focusing of said photo-taking means is accomplished by varying the refractive power of said second lens component.

5. An image deflecting device according to claim 1, wherein said second lens component further comprises a fixed lens and a lens movable along the optic axis.

6. An image deflecting device according to claim 5, wherein deflection is accomplished by inclining said movable lens.

7. An image deflecting device according to claim 1, wherein said one lens surface to be inclined has transmissivity and elasticity.

8. A photo-taking system including:
a photo-taking lens means for forming the image of an object;
detection means for detecting an inclination of said photo-taking lens means and outputting a detection signal which represents an amount of displacement; and
means for actively and selectively inclining a surface of a rearmost lens of said photo-taking lens in accordance with the detection signal output of said detection means.

9. A photo-taking system according to claim 8, wherein said photo-taking lens means has, in succession from the object side to the image surface side, a first lens component having a positive refractive power and a second lens component having a negative refractive power.

10. A photo-taking system according to claim 9, wherein focusing is accomplished by moving at least one lens of said second lens component along the optic axis.

11. A photo-taking system according to claim 9, wherein focusing is accomplished by varying the refractive power of at least one lens of said second lens component.

12. A photo-taking system according to claim 9, wherein said second lens component has, in at least a portion thereof, a lens having transmissivity and elasticity.

13. An image deflecting device comprising:
photo-taking lens means for forming an image of an object, the rearmost lens of said photo-taking lens means being transparent and comprising an elastic material; and
deflection means for performing a focusing operation by varying a curvature of a lens surface of imaging side of said rearmost lens and for deflecting the image by inclining said lens surface.

14. An image deflecting device according to claim 13 further comprising:
means for detecting an inclination of said device and creating a detection signal, wherein said deflection means inclines said lens surface in accordance with the detection signal of said detecting means.

* * * * *

UNITED STATES PATENT AND TRADEMARK OFFICE
CERTIFICATE OF CORRECTION

PATENT NO. : 5,073,017
DATED : December 17, 1991
INVENTOR(S) : SHIGEYUKI SUDA

It is certified that error appears in the above-identified patent and that said Letters Patent is hereby corrected as shown below:

In the Abstract

Line [57], "which near" should read --which is near--.

Column 1:

Line 15, "on" should be deleted.

Line 45, "system" should read --system.--

Column 2

Line 33, "tilling" should read --tilting--.

Column 3

Line 55, "a focal" should read --afocal--.

Column 4

Line 4, "shown" should read --shown by--.

Line 19, "hυ" should read -- $\bar{h}υ$ -- and " $\sum_{\mu=\mu}^{k}$ " should read -- $\sum_{\mu=υ}^{k}$ --.

UNITED STATES PATENT AND TRADEMARK OFFICE
CERTIFICATE OF CORRECTION

PATENT NO. : 5,073,017

DATED : December 17, 1991

INVENTOR(S) : SHIGEYUKI SUDA

It is certified that error appears in the above-identified patent and that said Letters Patent is hereby corrected as shown below:

Column 4:

Line 23, "$II_{84}$" should read --$II\upsilon$--.

Line 41, "$h\upsilon, h\upsilon,$" should read --$h\upsilon, \bar{h}\upsilon,$--.

Line 68, "expressed" should read --as illustrated--.

Signed and Sealed this

Fourth Day of May, 1993

Attest:

MICHAEL K. KIRK

Attesting Officer

Acting Commissioner of Patents and Trademarks